Figure 40:
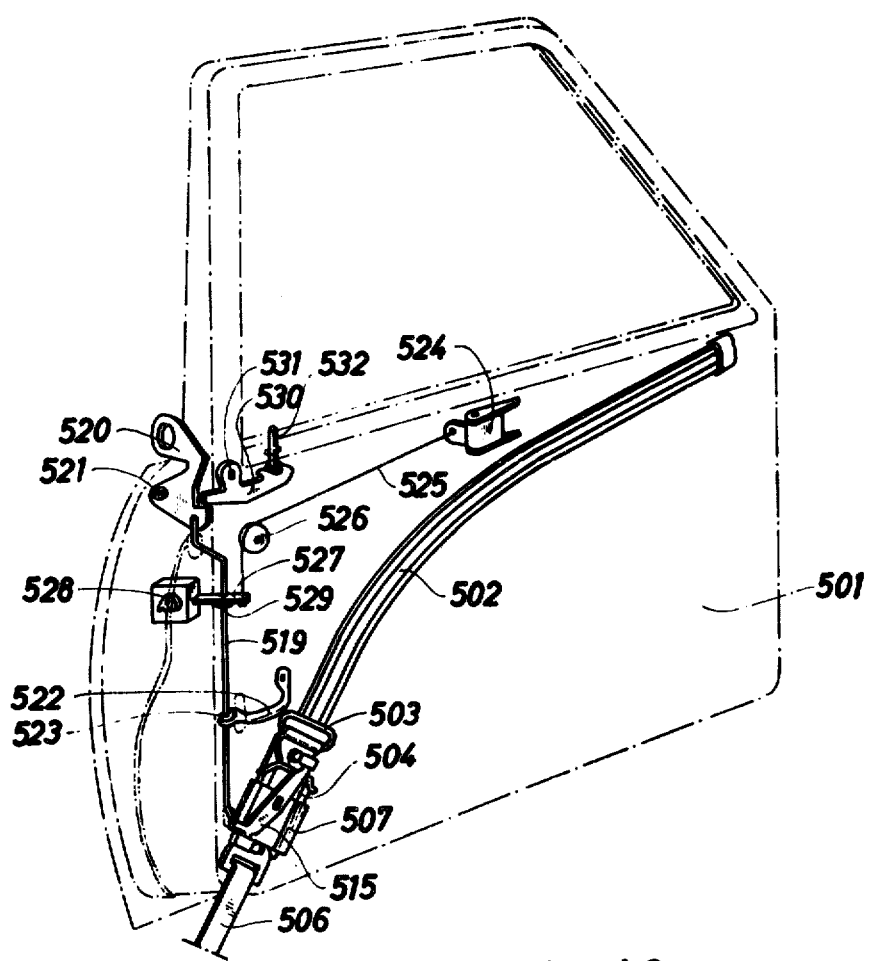

United States Patent [19]

Lindblad

[11] 3,927,902
[45] Dec. 23, 1975

[54] SAFETY BELT ARRANGEMENT FOR INDIVIDUALS

[76] Inventor: Oskar Lennart Lindblad, Hedasgatan 16, 440 20 Vargarda, Sweden

[22] Filed: Apr. 5, 1974

[21] Appl. No.: 458,291

Related U.S. Application Data

[62] Division of Ser. No. 179,134, Sept. 9, 1971, Pat. No. 3,822,760.

[30] Foreign Application Priority Data

| Sept. 9, 1970 | Sweden | 12225/70 |
| Sept. 25, 1970 | Sweden | 13045/70 |
| Nov. 2, 1970 | Sweden | 14714/70 |
| Dec. 30, 1970 | Sweden | 17726/70 |
| Dec. 31, 1970 | Sweden | 17858/70 |
| Feb. 10, 1971 | Sweden | 1694/71 |

[52] U.S. Cl............................................ 280/150 SB
[51] Int. Cl.².................................................. B60R 21/10
[58] Field of Search............ 280/150 SB; 180/82 C

[56] References Cited

UNITED STATES PATENTS

| 2,858,144 | 10/1958 | Oppenheim | 280/150 SB |
| 3,168,158 | 2/1965 | Schoeffler | 180/82 C |
| 3,311,188 | 3/1967 | Gutshall | 280/150 SB |
| 3,583,726 | 6/1971 | Lindblad | 280/150 SB |

*Primary Examiner*—Robert R. Song
*Attorney, Agent, or Firm*—Ulle C. Linton

[57] ABSTRACT

An emergency release mechanism in a passive restraint safety belt system in which a slide is detachably connected to said belt and moveably mounted on a vehicle door, a coupling means connected near the lower rear edge of said door to the vehicle, is also detachably connected to said slide by a locking means for the purpose of locking said door closed when said belt is in its rider restraining position and at least one releasing mechanism for releasing said belt and said locking means from said slide, being accessible from the outside of said door.

5 Claims, 2 Drawing Figures

SAFETY BELT ARRANGEMENT FOR INDIVIDUALS

The present invention relates to safety belts for vehicles.

The present application is a divisional application from my co-pending application Ser. No. 179,134 filed Sept. 9, 1971, now U.S. Pat. No. 3,822,760.

One object of the invention is to provide a safety belt which is very simple to put on so that persons using the vehicle will be induced to use the belt during each journey.

Another object of the invention is to provide a safety belt arrangement wherein the belt strap or straps in the position of non use are disposed in such a manner in front of the driver or passenger seat that it will not hinder entrance to the seat but will have to be tightened around the body in order not to cause an obstruction during the journey.

A further object of the invention is to provide a safety belt arrangement in which the strap or straps will automatically close around the driver or passenger after closing the door to the driver or passenger seat respectively, and upon closing an electric circuit.

Still further objects of the invention will be apparent from the following detailed disclosure.

A safety belt arrangement according to the invention comprises at least one belt strap extending across the body of a person sitting on the seat provided with the safety belt arrangement, one end of said strap being secured to the seat of the chassis of the vehicle to that side of the seat which is opposite to the nearest side wall of the vehicle and the opposite end of said strap being connected to attachment means slideable in a guide from a front position in which the safety belt is inactive to a rear position in which the safety belt is tightened around a person sitting in the seat and vice versa.

According to other features of the invention said guide for the slideable attachment means may be provided on the inside of a door of the vehicle, means being provided for automatically displacing said attachment means toward its rear position upon turning of the ignition key.

Figure 41:
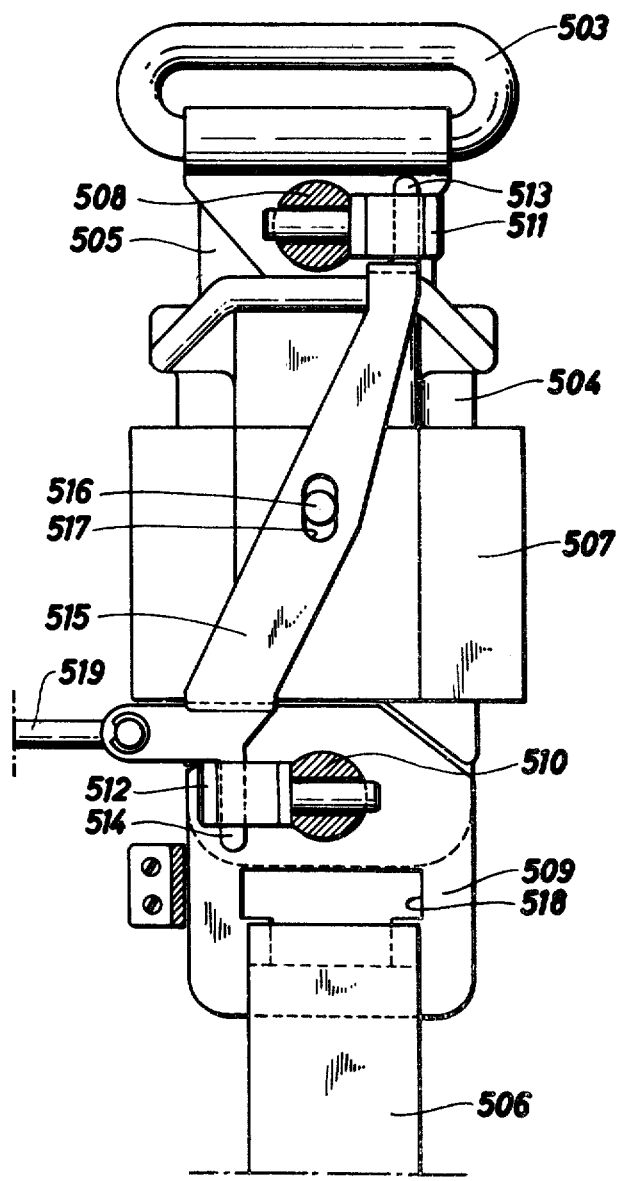

The invention will be more closely described herebelow with reference to the accompanying drawings wherein:

FIG. 40 is a view in perspective of an automobile door provided with an arrangement according to the invention, and FIG. 41 is a view on a larger scale of a detail of the arrangement illustrated in FIG. 40.

In FIGS. 40 – 41 an automobile door 501 shown in broken lines is provided at its inner side with a guide 502 preferably of C-shaped cross section and extending from a point at the front of the door to a lower point at the rear end of the door. The movable safety belt attachement 503 is carried by a slide slideable in the guide 502. A coupling member 504 is provided at the lower portion of the inner side of the door and has a slight freedom of movement in the longitudinal direction of the guide 502. The coupling member 504 is adapted to receive a second coupling member 505 carried by the slide. Numeral 506 indicates a fitting provided in the floor or in the door frame and adapted to lock the door in its closed position when the safety belt is in its operative position. The coupling member 504 is mounted to the door by means of an attachment 507 which permits said movement of the coupling member in the longitudinal direction of the guide. Coupling member 504 is actuated by springs or the like so that it will tend to move towards its lower rear position. The coupling member 505 is connected to the attachment 503 by means of a pin 508 which has a cross bore in the portion extending outside of the attachment 503. A plate shaped element 509 attached to the coupling member 504 is connected with the coupling member 504 in similar manner, that is by means of a pin 510 which also has a cross bore. In the position illustrated in the drawings the attachment 503 is maintained connected to the coupling 505 by means of a pin 511 inserted in said cross bore, and the element 509 is maintained connected to the coupling 504 by means of a corresponding pin 512. The pins 511 and 512 are provided with heads each having a cross bore for receiving pin-shaped end portions 513 and 514 on a rocker arm 515 which is pivoted on a shaft 516 on the attachment 507. The rocker arm shaft 516 extends through an elongated opening 517 in the rocker arm 515 to allow the latter a certain freedom of movement in the direction of movement of the coupling member 504. The element 509 has a T-shaped opening 518 and the fitting 506 has an upper end portion of such shape that it may be moved laterally into the wider portion of the opening 518 but will be locked to the element 509 when the latter is in the position shown in FIG. 41. By pulling out the pins 511 and 512 which in the embodiment shown is effected by swinging the rocker arm 515 in the clockwise direction, the attachement 503 may be released from the coupling member 505 and the element 509 may be released from the other portion of the coupling member 504. This will allow the slide to move forwardly and the coupling member 504 will be moved out of the engagement with the fitting 506. The swinging of the rocker arm 515 may be effected by pulling a rod 519 which in the embodiment shown extends upwardly to an operating handle 520 in the form of a two-armed lever pivoted on a shaft 521, one lever arm projecting outside the door and the other lever arm being connected to one end of the rod 519. On the inner side of the door there is provided a pivoted operating handle 522 which has its free end disposed below an abutment 523 of the rod 519. This means that the rocker arm 515 may be swung by lifting the handle 522. Numeral 524 indicates a handle for opening the door which is connected by means of a line 525 and a pulley 526 to an arm 527 on the conventional door lock 528. The rod 519 extends through the arm 527 at the lower side of which is provided an abutment 529 whereby also the normal door lock may be opened by swinging the lever 520 provided with the operating handle. A second two-armed lever 530 is pivoted on a shaft 531. One arm of the lever 530 is so arranged that in one position it will cooperate with an abutment on the lever 520 provided with the operating handle and the second arm is interconnected with a lock button 532 contained in the normal door lock. When the button 532 is pushed down, the lever 530 will swing in the clock-wise direction whereupon the abutment portion of the lever will extend across the corresponding abutment portion of the lever 520 which will thereby be locked in the position shown in FIG. 40. When the safety belt is in its position of non-use, that is when the slide with the belt attachment 503 and the coupling member 505 are disposed at the front end of the door, the coupling member 504 is withdrawn into the attachment 507 by means of springs or the like in such a manner that upon closing the end portion of the fitting 506 will be disposed opposite the wider portion of the opening 518 allowing the door to be closed. When the door is closed and the safety belt is tightened around the person sitting in the seat, that is when the slide with the attachment 503 and the coupling member 505 moves backwardly and engages the coupling member 504, the front end portion of rocker arm 515 will engage the opening in the pin 511 which is non-rotatable with respect to the pin 508. After completion of the interconnection between the coupling members 504 and 505 the slide is moved slightly in the opposite direction either through reversal of the direction of movement of the motor driving the slide or due to the pulling force in the safety belt which may be caused by a winding up roller or the like. The element 509 will then come to the position relative to the fitting 506 shown in FIG. 41 so that an auxilliary locking of the door to the door frame is obtained.

In the case of an accident as a result of which the person in the seat is unconcious or for other reasons is prevented from releasing himself from the seat, the safety belt may be released from the outer side of the vehicle by pulling the operating handle of the lever 520 which causes the operating rod 519 to the raised which inturn causes the rocker arm 515 to swing in the clockwise direction and consequently the withdrawal of the pins 511 and 512 from the pins 508 and 510, respectively. The belt attachment 503 will thereby be released from the coupling member 505 and the element 509 will be released from the coupling member 504 whereby the safety belt is released and the auxiliary door lock is opened. By abutment of the member 529 against the lever 527 of the lock 528 also the normal door lock will be released upon actuation of the operating handle. When the handle 524 is actuated for opening the door in the normal manner the arm 527 swings freely with respect to the operating rod 519 without actuating the rocker 515. A release may also take place from the inner side by pulling the handle 522 which will abut the member 523 and thus raise the rod 519. The locking device 530, 531 is intended to prevent unauthorized pulling of the operating handle for instance when the vehicle is left in a parking place. This arrangement is relevant for such vehicles where the button 532 is pushed down in connection with locking of the door.

I claim:

1. An emergency release mechanism in a passive restraint safety belt system comprising a vehicle having at least one door, a guide extending in a longitudinal direction of said vehicle on the inside of said door, a slide moveably mounted on said guide, a coupling means being positioned on and near the rear lower edge of said door, locking means being connected to said vehicle and detachably connected to said coupling means for at time locking said door closed, releasing means detachably connecting said coupling means, slide and belt, a second releasing means detachably connecting said coupling means and said locking means and means capable of operating both said releasing means and being accessible from the outside of said door.

2. An emergency release mechanism as claimed in claim 1 wherein said first releasing means includes a pin connected to said slide and having a lateral opening, a member connected to said belt having a opening with said pin detachably extending therethrough, said second releasing means including a pin connected to said coupling means and having a lateral opening, a plate having an opening with said second pin detachably extending therethrough and a second opening capable of detachably receiving a portion of said locking means, an arm pivotally mounted on said coupling means and having lateral pins detachably inserted in both said releasing means pin lateral openings and operably by said operating means.

3. An emergency release mechanism as claimed in claim 2 wherein said coupling means extend parallel to said door, a pin extends laterally from said coupling means and said arm is pivotally mounted on said pin and said pins extend in opposite directions to one another.

4. An emergency release mechanism as claimed in claim 3 wherein said coupling means is moveable in the longitudinal direction of said guide between two end stations located relatively close to one another with said coupling means at one station being free from said locking means and at the other station coupled to said locking means.

5. An emergency release mechanism as claimed in claim 4 wherein said pivoting arm is stationary and is provided with end portions designed to mate with corresponding portions to the cotter movable in the longitudinal direction of the rail, when the runner reaches its rear end position.

* * * * *